United States Patent
Krivak et al.

[11] Patent Number: 5,412,018
[45] Date of Patent: May 2, 1995

[54] SILICONE RUBBER REINFORCED WITH REINFORCED PRECIPITATED SILICA

[75] Inventors: Thomas G. Krivak, Akron, Ohio; Timothy A. Okel, Trafford, Pa.; Melvin P. Wagner, Wadsworth, Ohio

[73] Assignee: PPG Industries, Inc., Pittsburgh, Pa.

[21] Appl. No.: 741,921

[22] Filed: Aug. 8, 1991

Related U.S. Application Data

[62] Division of Ser. No. 541,679, Jun. 21, 1990, Pat. No. 5,094,829.

[51] Int. Cl.6 ............ C08J 5/10; C08K 3/34; C08L 83/04
[52] U.S. Cl. .................... 524/492; 524/493
[58] Field of Search ................... 524/492, 493

[56] References Cited

U.S. PATENT DOCUMENTS

| | | | |
|---|---|---|---|
| 2,657,149 | 10/1953 | Iler | 106/308 |
| 2,731,326 | 1/1956 | Alexander et al. | 23/182 |
| 2,940,830 | 6/1960 | Thornhill | 23/182 |
| 4,161,455 | 7/1979 | Wason | 252/174.25 |
| 4,243,428 | 1/1981 | Donnet et al. | 106/288 |
| 4,260,454 | 4/1981 | Wason et al | 162/181 |
| 4,263,051 | 4/1981 | Crawford et al. | 523/212 |
| 4,463,108 | 7/1984 | Wagner et al. | 523/216 |
| 4,677,141 | 6/1987 | Cornelius | 523/203 |
| 4,681,750 | 7/1987 | Johnson et al. | 423/339 |
| 4,704,425 | 11/1987 | Lagarde et al. | 524/492 |
| 4,708,859 | 11/1987 | Chevallier | 423/339 |
| 4,724,167 | 2/1988 | Evans et al. | 524/588 |
| 4,956,167 | 9/1990 | Aldcroft et al. | 423/339 |

Primary Examiner—Paul R. Michl
Assistant Examiner—U. K. Rajguru
Attorney, Agent, or Firm—George D. Morris

[57] ABSTRACT

Elastomeric compositions contain crosslinked poly(diorganosiloxane) and reinforced precipitated silica having, on a coating-free and impregnant-free basis, a surface area of from about 220 to about 340 square meters per gram, a pore diameter at the maximum of the volume pore size distribution function of from about 9 to about 20 nanometers, and a total intruded volume of from about 2.6 to about 4.4 cubic centimeters per gram.

10 Claims, No Drawings

SILICONE RUBBER REINFORCED WITH REINFORCED PRECIPITATED SILICA

This is a divisional of application Ser. No. 07/541,679, filed Jun. 21, 1990, now U.S. Pat. No. 5,094,826.

Many different precipitated silicas are known and have been used in a wide variety of applications. Precipitated silicas are most commonly produced by precipitation from an aqueous solution of sodium silicate using a suitable acid such as sulfuric acid, hydrochloric acid, and/or carbon dioxide. Processes for producing precipitated silicas are described in detail in U.S. Pat. Nos. 2,657,149; 2,940,830; and 4,681,750, the entire disclosures of which are incorporated herein by reference, including especially the processes for making precipitated silicas and the properties of the products.

Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15–29, 172–176, 218–233, 364–365, 462–465, 554–564, and 578–579, the entire disclosures of which are incorporated herein by reference. Silica gel is usually produced commercially at low pH by acidifying an aqueous solution of a soluble metal silicate, customarily sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmett, Teller (BET) method using nitrogen as the adsorbate, is often lower than that of silica gel.

Variations in the parameters and/or conditions during production result in variations in the types of precipitated silicas produced. Although they are all broadly precipitated silicas, the types of precipitated silicas often differ significantly in physical properties and sometimes in chemical properties. These differences in properties are important and often result in one type being especially useful for a particular purpose but of marginal utility for another purpose, whereas another type is quite useful for that other purpose but only marginally useful for the first purpose.

Reinforcement of precipitated silica, that is, the deposition of silica on aggregates of previously precipitated silica, is itself known. It has now been found, however, that by controlling the conditions of silica precipitation and multiple reinforcement steps, new silicas may be produced having properties that make them especially useful for clarifying beer and for reinforcing silicone rubbers. They also may be used for many of the purposes for which other types of precipitated silicas have been used. For example they may be used as reinforcing fillers for styrene-butadiene rubber and other organic rubbers. They may be used as fillers and extenders in toothpaste; as carriers for vitamins; as paper extenders and brighteners; and in a multitude of other uses.

Although it is not desired to be bound by any theory, it is believed that as precipitated silica is dried, the material shrinks; consequently, pore diameters are reduced, surface area is reduced, and the void volume is reduced. It is further believed that by sufficiently reinforcing the silica prior to drying, a more open structure is obtained after drying. Irrespective of theory, the reinforced precipitated silica of the present invention has, on balance, larger pore diameters and a larger total intruded volume for the surface area obtained than is the case for previous precipitated silicas, whether or not reinforced.

Accordingly, one embodiment of the invention is a process for producing reinforced amorphous precipitated silica having, on a coating-free and impregnant-free basis, a surface area of from about 220 to about 340 square meters per gram, a pore diameter at the maximum of the volume pore size distribution function of from about 9 to about 20 nanometers, and a total intruded volume of from about 2.6 to about 4.4 cubic centimeters per gram, the process comprising: (a) establishing an initial aqueous alkali metal silicate solution containing from about 0.5 to about 4 weight percent $SiO_2$ and having an $SiO_2:M_2O$ molar ratio of from about 1.6 to about 3.9; (b) over a period of at least about 20 minutes and with agitation, adding acid to the initial aqueous alkali metal silicate solution at a temperature below about 50° C. to neutralize at least about 60 percent of the $M_2O$ present in the initial aqueous alkali metal solution and thereby to form a first reaction mixture; (c) over a period of from about 115 to about 240 minutes, with agitation, and at a temperature of from about 80° C. to about 95° C., substantially simultaneously adding to the first reaction mixture: (1) additive aqueous alkali metal silicate solution, and (2) acid, thereby to form a second reaction mixture wherein the amount of the additive aqueous alkali metal silicate solution added is such that the amount of $SiO_2$ added is from about 0.5 to about 2 times the amount of $SiO_2$ present in the initial aqueous alkali metal silicate solution established in step (a) and wherein the amount of the acid added is such that at least about 60 percent of the $M_2O$ contained in the additive aqueous alkali metal silicate solution added during the simultaneous addition is neutralized; (d) adding acid to the second reaction mixture with agitation at a temperature of from about 80° C. to about 95° C. to form a third reaction mixture having a pH below 7; (e) aging the third reaction mixture with agitation at a pH below 7 and at a temperature of from about 80° C. to about 95° C. for a period of from about 1 to about 120 minutes; (f) with agitation and at a temperature of from about 80° C. to about 95° C., adding to the aged third reaction mixture additive aqueous alkali metal silicate solution to form a fourth reaction mixture having a pH of from about 7.5 to about 9; (g) forming a fifth reaction mixture by adding to the fourth reaction mixture with agitation and at a temperature of from about 80° C. to about 95° C., a further quantity of additive aqueous alkali metal silicate solution and adding acid as necessary to maintain the pH at from about 7.5 to about 9 during the addition of the further quantity of the additive aqueous alkali metal silicate solution, wherein: (1) the amount of the additive aqueous alkali metal silicate solution added in steps (f) and (g) is such that the amount of $SiO_2$ added in steps (f) and (g) is from about 0.05 to about 0.75 times the amount of $SiO_2$ present in the third reaction mixture, and (2) the additive aqueous alkali metal silicate solution is added in steps (f) and (g) over a collective period of at least about 40 minutes; (h) aging the fifth reaction mixture with agitation at a temperature of from about 80° C. to about 95° C. for a period of from about 5 to about 60 minutes; (i) adding acid to the aged fifth reaction mixture with agitation at a temperature of from about 80° C. to about 95° C. to form a sixth reaction mixture having a pH below 7; (j) aging the sixth reaction mixture with agitation at a pH below 7 and at a temperature of from about 80° C. to about 95° C. for a period of at least about 1 minute; (k) separating reinforced precipitated silica from most of the liquid of the aged sixth reaction mixture; (l) washing the separated reinforced precipitated silica with water; and (m) drying the washed reinforced precipitated silica, wherein: (n) the alkali metal silicate is lithium silicate, sodium silicate, potassium silicate, or a mixture thereof; and (o) M is lithium, sodium, potassium, or a mixture thereof.

Optionally, prior to step (c) the first reaction mixture is aged with agitation at a temperature of from about 30° C. to about 95° C. for a period of from about 5 to about 180 minutes.

The composition of the initial aqueous alkali metal silicate solution established in step (a) may vary widely. Generally the initial aqueous alkali metal silicate solution comprises from about 0.5 to about 4 weight percent $SiO_2$. In many cases the initial aqueous alkali metal silicate solution comprises from about 1 to about 3 weight percent $SiO_2$. From about 1.5 to about 2.5 weight percent $SiO_2$ is preferred. Usually the initial aqueous alkali metal silicate solution has an $SiO_2$:$M_2O$ molar ratio of from about 1.6 to about 3.9. Often the $SiO_2$:$M_2O$ molar ratio is from about 2.5 to about 3.6. Preferably the $SiO_2$:$M_2O$ molar ratio is from about 2.9 to about 3.6. Often the $SiO_2$:$M_2O$ molar ratio is from about 3.2 to about 3.3.

The composition of the additive aqueous alkali metal silicate solution may also vary widely. Usually the additive aqueous alkali metal silicate solution comprises from about 2 to about 30 percent by weight $SiO_2$. Often the additive aqueous alkali metal silicate solution comprises from about 10 to about 15 percent by weight $SiO_2$. From about 12 to about 13 weight percent $SiO_2$ is preferred. Frequently the additive aqueous alkali metal silicate solution has an $SiO_2$:$M_2O$ molar ratio of from about 1.6 to about 3.9. In many cases the $SiO_2$:$M_2O$ molar ratio is from about 2.5 to about 3.6. Preferably the $SiO_2$:$M_2O$ molar ratio is from about 2.9 to about 3.6. Often the $SiO_2$:$M_2O$ molar ratio is from about 3.2 to about 3.3. Additive aqueous alkali metal silicate solution having the same composition may be used throughout the various silicate additions, or additive aqueous alkali metal silicate solutions having differing compositions may be used in different silicate addition steps.

The acid used in the process may also vary widely. In general, the acid added in steps (b), (c), and (g) should be strong enough to neutralize alkali metal silicate and cause precipitation of silica. The acid added in steps (d) and (i) should be strong enough to reduce the pH to desired values within the specified ranges. The acid used in the various acid addition steps may be the same or different, but preferably it is the same. A weak acid such as carbonic acid produced by the introduction of carbon dioxide to the reaction mixture may be used for precipitation of silica, but a stronger acid must be used in steps (d) and (i) when it is desired to reduce the pH to values below 7. It is preferred to use strong acid throughout the process. Examples of the strong acids include sulfuric acid, hydrochloric acid, nitric acid, phosphoric acid, and acetic acid. The strong mineral acids such as sulfuric acid, hydrochloric acid, nitric acid, and phosphoric acid are preferred; sulfuric acid is especially preferred.

The acid addition of step (b) is made over a period of at least about 20 minutes. Frequently the acid addition of step (b) is made over a period of from about 20 to about 60 minutes. From about 26 to about 32 minutes is preferred.

The temperature of the reaction mixture during the acid addition of step (b) is below about 50° C. From about 30° C. to about 40° C. is preferred.

At least about 60 percent of the $M_2O$ present in the initial aqueous alkali metal silicate solution is neutralized during the acid addition of step (b). As much as 100 percent of the $M_2O$ may be neutralized if desired. Preferably from about 75 to about 85 percent of the $M_2O$ is neutralized.

The additions made in step (c) are made over a period of from about 115 to about 240 minutes. Preferably the additions are made over a period of from about 115 to about 125 minutes.

The temperature of the reaction mixture during the additions of step (c) is from about 80° C. to about 95° C. From about 90° C. to about 95° C. is preferred.

In step (c), the amount of additive aqueous alkali metal silicate added is such that the amount of $SiO_2$ added is from about 0.5 to about 2 times the amount of $SiO_2$ present in the initial aqueous alkali metal silicate solution established in step (a). From about 0.9 to about 1.1 times the $SiO_2$ present in the initial aqueous alkali metal silicate solution is preferred.

The amount of acid added in step (c) is such that at least about 60 percent of the $M_2O$ contained in the additive aqueous alkali metal silicate solution added in step (c) is neutralized. As much as 100 percent of such $M_2O$ may be neutralized if desired. Preferably from about 75 to about 85 percent of the $M_2O$ is neutralized.

The temperature of the reaction mixture during the acid addition of step (d) is from about 80° C. to about 95° C. From about 90° C. to about 95° C. is preferred.

In step (d), the acid is added such that the pH of the third reaction mixture is below 7. Often the pH is from about 2.5 to below 7. A pH of from about a to about 5 is preferred.

Similarly, the third reaction mixture is aged in step (e) at a pH below 7. Often the pH is from about 2.5 to below 7. A pH of from about 4 to about 5 is preferred.

The temperature of the third reaction mixture during the aging of step (e) is from about 80° C. to about 95° C. From about 90° C. to about 95° C. is preferred.

The aging in step (e) is for a period of from about 1 to about 120 minutes. In many cases the third reaction mixture is aged for a period of from about 15 to about 120 minutes. A period of from about 15 to about 30 minutes is preferred.

The temperature of the reaction mixture during the addition of additive aqueous alkali metal silicate solution in step (f) is from about 80° C. to about 95° C. From about 90° C. to about 95° C. is preferred.

The pH of the fourth reaction mixture formed in step (f) is from about 7.5 to about 9. A pH of from about 8 to about 9 is preferred.

Acid is added in step (g) as necessary to maintain the pH of the reaction mixture at from about 7.5 to about 9 during the addition of the further quantity of additive aqueous alkali metal silicate solution. A pH of from about 8 to about 9 is preferred.

The amount of additive aqueous alkali metal silicate solution added in steps (f) and (g) is such that the amount of $SiO_2$ added in steps (f) and (g) is from about 0.05 to about 0.75 times the amount of $SiO_2$ present in the third reaction mixture. Preferably the amount of additive aqueous alkali metal silicate solution added in steps (f) and (g) is such that the amount of $SiO_2$ added in steps (f) and (g) is from about 0.25 to about 0.45 times the amount of $SiO_2$ present in the third reaction mixture.

The additive alkali metal silicate solution is added in steps (f) and (g) over a collective period of at least about 40 minutes. A collective period of from about 40 to about 240 minutes is often employed. A collective period of from about 70 to about 100 minutes is preferred.

The temperature of the fifth reaction mixture during the aging of step (h) is from about 80° C. to about 95° C. From about 90° C. to about 95° C. is preferred.

In step (h), the fifth reaction mixture is aged for a period of from about 5 to about 60 minutes. A period of from about 30 to about 60 minutes is preferred.

The temperature of the reaction mixture during the acid addition of step (i) is from about 80° C. to about 95° C. From about 90° C. to about 95° C. is preferred.

In step (i), the acid is added such that the pH of the sixth reaction mixture is below 7. Often the pH is from about 2.5 to below 7. A pH of from about 4 to about 5 is preferred.

The sixth reaction mixture is aged in step (j) at a pH below 7. In many cases the pH is from about 2.5 to below 7. A pH of from about 4 to about 5 is preferred.

The temperature of the sixth reaction mixture during the aging of step (j) is from about 80° C. to about 95° C. From about 90° C. to about 95° C. is preferred.

In step (j), the sixth reaction mixture is aged for a period of at least about 1 minute. Often the aging period is at least about 30 minutes. An aging period of at least about 50 minutes is preferred.

The separation of step (k) may be accomplished by one or more techniques for separating solids from liquid such as, for example, filtration, centrifugation, decantation, and the like.

The washing of step (l) may be accomplished by any of the procedures known to the art for washing solids. Examples of such procedures include passing water through a filter cake, and reslurring the reinforced precipitated silica in water followed by separating the solids from the liquid. One washing cycle or a succession of washing cycles may be employed as desired. The primary purpose of washing is to remove salt formed by the various neutralizations to desirably low levels. Usually the reinforced precipitated silica is washed until the concentration of salt in the dried reinforced precipitated silica is less than or equal to about 2 percent by weight. Preferably the reinforced precipitated silica is washed until the concentration of salt is less than or equal to about 0.2 percent by weight.

The drying of step (m) may also be accomplished by one or more known techniques. For example, the reinforced precipitated silica may be dried in an air oven or in a vacuum oven. Preferably the reinforced precipitated silica is dispersed in water and spray dried in a column of hot air. The temperature at which drying is accomplished is not critical, but the usual practice is to employ temperatures of at least 70° C. Generally the drying temperature is less than about 700° C. In most cases drying is continued until the reinforced precipitated silica has the characteristics of a powder. Ordinarily the dried reinforced precipitated silica is not absolutely anhydrous but contains bound water (from about 2 to about 5 weight percent) and adsorbed water (from about 1 to about 7 weight percent) in varying amounts, the latter depending partly upon the prevailing relative humidity. Adsorbed water is that water which is removed from the silica by heating at 105° C. for 24 hours at atmospheric pressure in a laboratory oven. Bound water is that water which is removed by additionally heating the silica at calcination temperatures, for example, from about 1000° C. to about 1200° C.

Another optional step which may be employed is size reduction. Size reduction techniques are themselves well known and may be exemplified by grinding and pulverising. Particularly preferred is fluid energy milling using air or superheated steam as the working fluid. Fluid energy mills are themselves well known. See, for example, *Perry's Chemical Engineers' Handbook*, 4th Edition, McGraw-Hill Book Company, New York, (1963), Library of Congress Catalog Card Number 6113168, pages 8–42 and 8–43; McCabe and Smith, *Unit Operations of Chemical Engineering*, 3rd Edition, McGraw-Hill Book Company, New York (1976), ISBN 0-07-044825-6, pages 844 and 845; F. E. Albus, "The Modern Fluid Energy Mill", *Chemical Engineering Progress*, Volume 60, No. 6 (June 1964), pages 102–106, the entire disclosures of which are incorporated herein by reference. In fluid energy mills the solid particles are suspended in a gas stream and conveyed at high velocity in a circular or elliptical path. Some reduction occurs when the particles strike or rub against the walls of the confining chamber, but most of the reduction is believed to be caused by interparticle attrition.

The degrees of agitation used in the various steps of the invention may vary considerably. The agitation employed during the addition of one or more reactants should be at least sufficient to provide a thorough dispersion of the reactants and reaction mixture so as to avoid more than trivial locally high concentrations of reactants and to ensure that silica deposition occurs substantially uniformly thereby avoiding gellation on the macro scale. The agitation employed during aging should be at least sufficient to avoid settling of solids to ensure that silica deposition occurs substantially uniformly throughout the mass of silica particles rather than preferentially on those particles at or near the top of a settled layer of particles. The degrees of agitation may, and preferably are, greater than these minimums. In general, vigorous agitation is preferred.

Yet another optional step which may be employed is treating the reinforced precipitated silica with one or more materials which coat, partially coat, impregnate, and/or partially impregnate the silica. Many materials may be used for this purpose. In general, the type of material used depends upon the effect desired. Most often the materials are organic polymers. Examples of suitable materials include hydrocarbon oils, polyesters, polyamides, phenolic resins, aminoplast resins, polysiloxanes, polysilanes, and the like. The treatment step may be accomplished at any convenient time during or after formation of the reinforced precipitated silica.

A preferred embodiment within the first embodiment of the invention is a process for producing reinforced amorphous precipitated silica having, on a coating-free and impregnant-free basis, a surface area of from about 220 to about 340 square meters per gram, a pore diameter at the maximum of the volume pore size distribution function of from about 13 to about 18 nanometers, and a total intruded volume of from about 3 to about 4.4 cubic centimeters per gram, the process comprising: (a) establishing an initial aqueous alkali metal silicate solution containing from about 0.5 to about 4 weight percent $SiO_2$ and having an $SiO_2:M_2O$ molar ratio of from about 1.6 to about 3.9; (b) over a period of at least about 20 minutes and with agitation, adding acid to the initial aqueous alkali metal silicate solution at a temperature of from about 30° C. to about 40° C. to neutralize from about 75 to about 85 percent of the $M_2O$ present in the initial aqueous alkali metal solution and to form a first reaction mixture; (c) over a period of from about 115 to about 125 minutes, with agitation, and at a temperature of from about 90° C. to about 95° C., substantially simultaneously adding to the first reaction mixture: (1) additive aqueous alkali metal silicate solution, and (2) acid, to form a second reaction mixture wherein the amount of the additive aqueous alkali metal silicate solution added is such that the amount of $SiO_2$ added is from about 0.9 to about 1.1 times the amount of $SiO_2$ present in the initial aqueous alkali metal silicate solution established in step (a) and wherein the amount of the acid added is such that from about 75 to about 85 percent of the $M_2O$ contained in the additive aqueous alkali metal silicate solution added during the simultaneous addition is neutralized; (d) adding acid to the second reaction mixture with agitation at a temperature of from about 90° C. to about 95° C. to form a third reaction mixture having a pH of from about 4 to about 5; (e) aging the third reaction mixture with agitation at a temperature of from about 90° C. to about 95° C. for a period of from about 15 to about 30 minutes; (f) with agitation and at a temperature of from about 90° C. to about 95° C., adding to the aged third reaction mixture additive aqueous alkali metal silicate solution to form a fourth reaction mixture having a pH of from about 8 to about 9; (g) forming a fifth reaction mixture by adding to the fourth reaction mixture with agitation and at a temperature of from about 90° C. to about 95° C., a further quantity of additive aqueous alkali metal silicate solution and adding acid as necessary to maintain the pH at from about 8 to about 9 during the addition of the further quantity of the additive aqueous alkali metal silicate solution, wherein: (1) the amount of the additive aqueous alkali metal silicate solution added in steps (f) and (g) is such that the amount of $SiO_2$ added in steps (f) and (g) is from about 0.25 to about 0.45 times the amount of $SiO_2$ present in the third reaction mixture, and (2) the additive aqueous alkali metal silicate solution is added in steps (f) and (g) over a collective period of from about 70 to about 100 minutes; (h) aging the fifth reaction mixture with agitation at a temperature of from about 90° C. to about 95° C. for a period of from about 30 to about 60 minutes; (i) adding acid to the aged fifth reaction mixture with agitation at a temperature of from about 90° C. to about 95° C. to form a sixth reaction mixture having a pH of from about 4 to about 5; (j) aging the sixth reaction mixture with agitation at a temperature of from about 90° C. to about 95° C. for a period of at least about 50 minutes; (k) separating reinforced precipitated silica from most of the liquid of the aged sixth reaction mixture; (l) washing the separated reinforced precipitated silica with water; and (m) drying the washed reinforced precipitated silica, wherein: (n) the alkali metal silicate is lithium silicate, sodium silicate, potassium silicate, or a mixture thereof; and (o) M is lithium, sodium, potassium, or a mixture thereof.

It is understood that one or more ranges in the preferred embodiment may be used in lieu of the corresponding broader range or ranges in the broader first embodiment of the invention.

A further embodiment of the invention is reinforced amorphous precipitated silica having, on a coating-free and impregnant-free basis, a surface area of from about 220 to about 340 square meters per gram, a pore diameter at the maximum of the volume pore size distribution function of from about 9 to about 20 nanometers, and a total intruded volume of from about 2.6 to about 4.4 cubic centimeters per gram. The concurrence of all three of these properties is essential to the reinforced precipitated silica of the present invention.

As used in the present specification and claims, the surface area of the reinforced amorphous precipitated silica is the surface area determined by the Brunauer, Emmett, Teller (BET) method according to ASTM C 819–77 using nitrogen as the adsorbate but modified by outgassing the system and the sample for one hour at 180° C. The surface area is from about 220 to about 340 square meters per gram. In many cases the surface area is from about 220 to about 300 square meters per gram. From about 220 to about 270 square meters per gram is preferred. ASTM C 819–77 is, in its entirety, incorporated herein by reference.

The volume average pore size distribution function of the reinforced amorphous precipitated silica is determined by mercury porosimetry using an Autoscan mercury porosimeter (Quantachrome Corp.) in accordance with the accompanying operating manual. In operating the porosimeter, a scan is made in the high pressure range (from about 103 kilopascals absolute to about 227 megapascals absolute). The volume pore size distribution function is given by the following equation:

$$D_v(d) = \frac{P}{d} \frac{dV}{dP}$$

where:

- $D_v(d)$ is the volume pore size distribution function, usually expressed in $cm^3/(\mu m \cdot g)$;
- $d$ is the pore diameter, usually expressed in $\mu m$;
- $P$ is the pressure, usually expressed in pounds per square inch, absolute; and
- $V$ is the pore volume per unit mass, usually expressed in $cm^3/g$.

$Dv(d)$ is determined by taking $\Delta V/\Delta P$ for small values of $\Delta P$ from either a plot of $V$ versus $P$ or preferably from the raw data. Each value of $\Delta V/\Delta P$ is multiplied by the pressure at the upper end of the interval and divided by the corresponding pore diameter. The resulting value is plotted versus the pore diameter. The value of the pore diameter at the maximum of the volume pore size distribution function is then taken from the plotted graph. Numerical procedures may be used rather than graphical when desired. For the reinforced amorphous precipitated silica of the present invention the pore diameter at the maximum of the volume pore size distribution function is from about 9 to about 20 nanometers. Preferably the pore diameter at the maximum of the function is from about 13 to about 18 nanometers.

In the course of determining the volume average pore diameter by the above procedure, the maximum pore radius detected is sometimes noted. The maximum pore diameter is twice the maximum pore radius.

The total intruded volume is the total volume of mercury which is intruded into the reinforced amorphous precipitated silica during the high pressure scan described above divided by the mass of the reinforced amorphous precipitated silica constituting the sample under test. The total intruded volume of the reinforced amorphous precipitated silica is from about 2.6 to about 4.4 cubic centimeters per gram. Preferably the total intruded volume is from about 3 to about 4.4 cubic centimeters per gram.

The reinforced amorphous precipitated silica may be in the form of aggregates of ultimate particles, agglomerates of aggregates, or a combination of both. Ordinarily, less than about 10 percent by weight of the reinforced amorphous precipitated silica has gross particle sizes greater than about 80 micrometers as determined by use of a Model TAII Coulter counter (Coulter Electronics, Inc.) according to ASTM C 690-80 but modified by stirring the precipitated silica for 10 minutes in Isoton II electrolyte (Curtin Matheson Scientific, Inc.) using a four-blade, 4.5 centimeter diameter propeller stirrer. In many cases less than about 10 percent by weight of the reinforced amorphous precipitated silica has gross particle sizes greater than about 40 micrometers. When size reduction is employed usually less than about 10 percent by weight of the reinforced amorphous precipitated silica has gross particle sizes greater than about 20 micrometers. Preferably less than about 10 percent by weight of the reinforced amorphous precipitated silica has gross particle sizes greater than about 10 micrometers. When less than about 10 percent by weight of the reinforced amorphous precipitated silica has gross particle sizes greater than about 20 micrometers, it is preferred that the median gross particle size be less than about 5 micrometers. When less than about 10 percent by weight of the reinforced amorphous precipitated silica has gross particle sizes greater than about 10 micrometers, it is preferred that the median gross particle size be less than about 2 micrometers. It is expected that in some usages such as fillers for battery separators, microporous materials, and rubbers, the sizes of reinforced amorphous precipitated silica aggregates will be reduced during processing of the ingredients to prepare the final articles. Accordingly, the distribution of gross particle sizes in such articles may be smaller than in the raw reinforced amorphous precipitated silica itself. ASTM C 690-80 is, in its entirety, incorporated herein by reference.

The average ultimate particle size of the reinforced amorphous precipitated silica (irrespective of whether or not the ultimate particles are aggregated and/or agglomerated) is usually less than about 0.1 micrometer as determined by transmission electron microscopy. Often the average ultimate particle size is less than about 0.05 micrometer. Preferably the average ultimate particle size is less than about 0.03 micrometer.

The neutralization of alkali metal silicate with acid to produce the reinforced amorphous precipitated silica of the invention also produces alkali metal salt of the acid(s) used for neutralization as by-product. It is preferred that the amount of such salt associated with the reinforced amorphous precipitated silica product be low. When the reinforced amorphous precipitated silica is separated from the liquid of the aged sixth reaction mixture, most of the salt is removed with the liquid. Further amounts of salt may conveniently be removed by washing the separated reinforced precipitated silica with water. In general, the greater the amount of water used for washing, the lower will be the salt content of the final dried product. It is usually preferred that reinforced amorphous precipitated silica contain less than about 1 percent by weight alkali metal salt. Frequently the reinforced amorphous precipitated silica contains less than about 0.5 percent by weight alkali metal salt. It is often particularly preferred that the reinforced amorphous precipitated silica contain less than about 0.2 percent by weight alkali metal salt.

The reinforced amorphous precipitated silica of the present invention may be hydrophilic or it may be hydrophobic. Hydrophobic precipitated silica may be produced either by treating the hydrophilic precipitated silica with a hydrophobic coating or impregnating composition, or by adding hydrophobes to the precipitated but undried silica. Examples of methods for treating hydrophilic precipitated silica to render it hydrophobic include: (1) treatment after the manner of Iler, U.S. Pat. No. 2,657,149; (2) treatment with silane containing hydrophobic group(s) and hydrolyzable group(s); (3) treatment with hexamethyldisilazane; and (4) treatment with silicone oil such as for instance, trimethyl end-blocked poly(dimethylsiloxane) or silanol terminated poly(dimethylsiloxane). In general, hydrophobic precipitated silica is more compatible with silicone rubber than hydrophilic precipitated silica. Treatment of hydrophilic precipitated silica with silicone oil is the preferred method for producing hydrophobic precipitated silica because it has been found that the silicone oil not only improves compatibility of the precipitated silica with silicone rubber, but it also often results in silicone rubbers having lower hardness. The silicone oils are themselves well known and are poly(organosiloxanes) which are flowable. The molecular weights of the silicone oils may vary widely, but usually they are in the range of from about 150 to about 450,000. Often the molecular weight is in the range of from about 200 to about 100,000. From about 400 to about 4500 is preferred. Although it is not desired to be bound by any theory, it is believed that the surfaces of the precipitated silica particles have hydroxyl groups attached to silicon atoms. When the silicone oil is applied to the particles and heated, it is further believed that at least some of the existing terminal groups and/or some of the terminal groups created by chain scission of the silicone oil condense with at least some of the hydroxyls of the particle surface to form siloxane bonds and evolve water, alcohol, or some other compound, depending upon the identities of the terminal groups. It is also believed that some of the existing terminal groups and/or some of the terminal groups created by chain scission of the silicone oil condense with other such terminal groups of the same or different silicone oil molecules to form siloxane bonds and evolve water, alcohol, or other compound. Ring structures, linear structures (including those of increased molecular weight), and, if some silicone oil having a functionality greater than two is also present, network structures may result. Irrespective of theory, a preferred embodiment is hydrophobic reinforced amorphous precipitated silica of the invention which comprises silicone oil or condensation residue thereof.

The reinforced amorphous precipitated silica of the present invention is generally such that when a uniform mixture of 100 parts by weight Silastic ® Q4-2735 silicone gum (Dow Corning Corp. ), 40 parts by weight of the reinforced amorphous precipitated silica, 8 parts by weight of Silastic ® Q4-2737 Processing Aid (Dow Corning Corp.), and 0.5 part by weight of 2,5-dimethyl-2,5-bis(tert-butylperoxy)hexane is sheeted out at a thickness of 2.03 millimeters, placed in a mold and cured under a pressure of 10.3 megapascals and at a temperature of 170° C. for 10 minutes, died out according to ASTM D 412-87 using Die C, post cured at 250° C. for one hour, and tested for tensile strength according to ASTM D 412-87 using Method A, exhibits a tensile strength of at least 7.24 megapascals. Specimens prepared for tensile strength testing in this manner usually also exhibit a Durometer Shore A hardness according to ASTM D 2240-86 of at least 50. ASTM D 412-87 and ASTM D 2240-86 are, in their entireties, incorporated herein by reference.

Another embodiment of the invention is an elastomeric composition comprising: (a) crosslinked poly(diorganosiloxane), and (b) reinforced amorphous precipitated silica having, on a coating-free and impregnant-free basis, a surface area of from about 220 to about 340 square meters per gram, a pore diameter at the maximum of the volume pore size distribution function of from about 9 to about 20 nanometers, and a total intruded volume of from about 2.6 to about 4.4 cubic centimeters per gram; the silica being distributed substantially uniformly throughout the crosslinked poly(diorganosiloxane).

The reinforced amorphous precipitated silica of the present invention is incorporated into a silicone elastomer gum in amounts sufficient to reinforce the silicone rubber when cured, i.e., reinforcing amounts. Usually the amount of precipitated silica used will range from about 10 to about 100, in many cases from 20 to 70, preferably 30 to 60 parts ok silica per 100 parts of silicone elastomer, by weight.

As the silicone elastomer gum, there can be used any of the silicone gums known in the art which are cured, i.e., crosslinked, to a silicone rubber by means of a free radical generator. Examples of silicone gums include the methyl, vinyl, phenyl, methyl vinyl, methyl phenyl and fluorinated silicone gums.

Free radical generators used to catalyze the curing (crosslinking) of the silicone gums are most frequently organic peroxides or gamma or high energy electron radiation. Exemplary of the organic peroxides commonly used are benzoyl peroxide, bis(2,4-dichlorobenzoyl) peroxide, 2,5-dimethyl-2,5-bis(tert-butylperoxy)hexane, tert-butyl peroxybenzoate, and dicumyl peroxide. The peroxide is usually used in amounts of from about 0.2 to about 1 part per 100 parts of gum, by weight.

In addition to the precipitated silica and free radical generator, the silicone gum can contain other additives such as processing aids (0 to about 12 parts per 100 parts of gum, by weight), silane additive (0 to about 1 part per 100 parts of gum, by weight), colorants, heat stabilizers, plasticizers, etc. The listing of optional ingredients is by no means exhaustive. These and other ingredients may be employed in their customary amounts for their customary purposes so long as they do not seriously interfere with good polymer formulating practice. All the ingredients except the peroxide are mixed in equipment such as a Banbury internal mixer, a Sigma mixer, or a Baker-Perkins mixer until uniform. The mixture is then cooled, if necessary, and the peroxide initiator is added. The mixture is then mixed to distribute the initiator substantially uniformly throughout. The catalyzed mixture is then cured in a manner known to the art. Ordinarily, the mixture is cured at about 170° C. for about 10 to about 15 minutes. Post cures of from about 1 to about 4 hours at about 250° C. are often also used.

The invention is further described in conjunction with the following examples which are to be considered illustrative rather than limiting, and in which all parts are parts by weight and all percentages are percentages by weight unless otherwise specified.

EXAMPLE I

An initial aqueous sodium silicate solution in the amount of 58.881 liters was established in a reactor. The initial aqueous sodium silicate solution contained about 2 weight percent $SiO_2$ and had an $SiO_2:Na_2O$ molar ratio of about 3.3. The initial aqueous sodium silicate solution was heated to 34° C. and over a period of 28 minutes and with agitation, 26.708 liters of about 2 weight percent aqueous sulfuric acid was added to the initial aqueous alkali metal silicate solution thereby to neutralize about 80 percent of the $Na_2O$ and to form a first reaction mixture. Over a period of 121 minutes, with agitation, and at a temperature of 80° C., a stream of 9.059 liters of additive aqueous sodium silicate solution containing about 13 weight percent $SiO_2$ and having an $SiO_2:Na_2O$ molar ratio of about 3.3, and a stream of 15.321 liters of about 4 weight percent aqueous sulfuric acid were added simultaneously to the first reaction mixture to form a second reaction mixture. The pH of the second reaction mixture was 9.1. A stream of about 8 liters of about 4 weight percent aqueous sulfuric acid was added to the second reaction mixture with agitation at a temperature of 80° C. to form a third reaction mixture having a pH of 4.5. The third reaction mixture was aged with agitation at 80° C. for 30 minutes. The aged third reaction mixture was split into two approximately equal portions. With agitation, 0.45 liter of additive aqueous sodium silicate solution containing about 13 weight percent $SiO_2$ and having an $SiO_2:Na_2O$ molar ratio of about 3.3 was added to one portion of the aged third reaction mixture at 80° C. to form a fourth reaction mixture having a pH of 8.5. A fifth reaction mixture was formed by adding to the fourth reaction mixture with agitation and at a temperature of 80° C., 2.271 liters of additive aqueous sodium silicate solution containing about 13 weight percent $SiO_2$ and having an $SiO_2$:$Na_2O$ molar ratio of about 3.3 and by adding 5.5 liters of about 4 weight percent aqueous sulfuric acid simultaneously to maintain the pH at about 8.5. The sequential additions to form the fourth and fifth reaction mixtures were made over a collective time period of 43 minutes. The fifth reaction mixture was aged with agitation at 80° C. for 45 minutes. With agitation, 1.5 liters of about 4 weight percent aqueous sulfuric acid was added to the aged fifth reaction mixture to form a sixth reaction mixture having a pH of 4.5. The sixth reaction mixture was aged with agitation at 80° C. for 60 minutes. The aged sixth reaction mixture was vacuum filtered using a series of Buchner funnels. Just before air could be pulled through each filter cake, the addition of 16 liters of water to the funnel was begun for the purpose of washing the filter cake. Air was briefly pulled through the washed filter cake. The wet filter cake contained 9.9 percent solids by weight. After being removed from the funnels, the wet filter cakes were stirred with a propeller type agitator to form a solid in liquid suspension. The suspension was dried in a Niro spray drier (inlet temperature about 360° C.; outlet temperature about 128° C.) to form a batch of dried reinforced precipitated silica. The product had a surface area of 333 square meters per gram, a pore diameter at the maximum of the volume pore size distribution function of 9 nanometers, and a total intruded volume of 3.21 cubic centimeters per gram. The product was micronized in a fluid energy mill using compressed air as the working fluid.

EXAMPLE II

An initial aqueous sodium silicate solution in the amount of 340.7 liters was established in a reactor. The initial aqueous sodium silicate solution contained about 2 weight percent $SiO_2$ and had an $SiO_2$:$Na_2O$ molar ratio of about 3.3. The initial aqueous sodium silicate solution was heated to 37° C. and over a period of 30 minutes and with agitation, 2.449 liters of about 30 weight percent aqueous sulfuric acid and 137.426 liters of water were added as separate streams to the initial aqueous alkali metal silicate solution to neutralize about 80 percent of the $Na_2O$ and to form a first reaction mixture. The first reaction mixture was heated with agitation to 95° C. During the heat-up 74.8 liters of water was added. The diluted first reaction mixture was then aged with agitation at 95° C. for 60 minutes. Over a period of 120 minutes, with agitation, and at a temperature of 95° C., a stream of 52.41 liters of additive aqueous sodium silicate solution containing about 13 weight percent $SiO_2$ and having an $SiO_2$:$Na_2O$ molar ratio of about 3.3 and a stream of 9.449 liters of about 30 weight percent aqueous sulfuric acid were added to the aged diluted first reaction mixture to form a second reaction mixture. The pH of the second reaction mixture was 9.1. A stream of about 8 liters of about 30 weight percent aqueous sulfuric acid was added to the second reaction mixture with agitation at a temperature of 95° C. to form a third reaction mixture having a pH of 4.5. The third reaction mixture was aged with agitation at 95° C. for 30 minutes. With agitation, 6.57 liters of additive aqueous sodium silicate solution containing about 13 weight percent $SiO_2$ and having an $SiO_2$:$Na_2O$ molar ratio of about 3.3 was added to the aged third reaction mixture at 95° C. to form a fourth reaction mixture having a pH of 8.7. A fifth reaction mixture was formed by adding to the fourth reaction mixture with agitation and at a temperature of 95° C., 30.18 liters of additive aqueous sodium silicate solution containing about 13 weight percent $SiO_2$ and having an $SiO_2$:$Na_2O$ molar ratio of about 3.3, and by adding liters of about 30 weight percent aqueous sulfuric acid as necessary to maintain the pH at about 8.7. The sequential additions to form the fourth and fifth reaction mixtures were made over a collective time period of 84 minutes. The fifth reaction mixture was aged with agitation at 95° C. for 45 minutes. With agitation, 3.5 liters of about 30 weight percent aqueous sulfuric acid was added to the aged fifth reaction mixture to form a sixth reaction mixture having a pH of 4.5. The sixth reaction mixture was aged with agitation for 60 minutes maintaining 95° C. and thereafter for about 900 minutes without temperature maintenance. The temperature at the conclusion of the 900 minute period was 66° C. The aged sixth reaction mixture was filtered in a filter press. The filter cake was washed with water until the conductivity of the filtrate had dropped to 90 micromhos/cm. The wet filter cake and added water were mixed with a Cowles blade to form a solid in liquid suspension containing 9.7 percent solids by weight. The suspension was dried in a Niro spray drier (inlet temperature about 360° C.; outlet temperature about 128° C.) to form the reinforced precipitated silica product. The product had a surface area of 232 square meters per gram, a pore diameter at the maximum of the volume pore size distribution function of 14 nanometers, and a total intruded volume of 3.09 cubic centimeters per gram. The product was micronized in a fluid energy mill using compressed air as the working fluid.

EXAMPLE III

An initial aqueous sodium silicate solution in the amount of 41314 liters was established in a reactor. The initial aqueous sodium silicate solution contained about 2 weight percent $SiO_2$ and had an $SiO_2$:$Na_2O$ molar ratio of about 3.2. The initial aqueous sodium silicate solution was heated to 34° C. and over a period of 33 minutes and with agitation, 1086 liters of about 30 weight percent aqueous sulfuric acid and 11356 liters of water were added to the initial aqueous alkali metal silicate solution to neutralize about 80 percent of the $Na_2O$ and to form a first reaction mixture. The first reaction mixture was heated with agitation to 95° C. over a period of about 2 hours. The first reaction mixture was then aged with agitation at 95° C. for 65 minutes. A total of 2557 liters of water were added during the heating and aging periods. Over a period of 119 minutes, with agitation, and at a temperature of 95° C., a stream of 6314 liters of additive aqueous sodium silicate solution containing about 12.6 weight percent $SiO_2$ and having an $SiO_2$:$Na_2O$ molar ratio of about 3.2, a stream of 1124 liters of about 30 weight percent aqueous sulfuric acid, and a stream of 549 liters of water were added simultaneously to the first reaction mixture to form a second reaction mixture. The pH of the second reaction mixture was 9.6. A stream of about 777 liters of about 30 weight percent aqueous sulfuric acid and a stream of 117 liters of water were added to the second reaction mixture with agitation at a temperature of 95° C. to form a third reaction mixture having a pH of 4.5. The third reaction mixture was aged with agitation at 95° C. for 30 minutes during which period 46 liters of water was added. With agitation, water and 890 liters of additive aqueous sodium silicate solution containing about 12.6 weight percent SiO$_2$ and having an SiO$_2$:Na$_2$O molar ratio of about 3.2 was added to the aged third reaction mixture at 95° C. to form a fourth reaction mixture having a pH of 8.5. A fifth reaction mixture was formed by adding to the fourth reaction mixture with agitation and at a temperature of 95° C., water and 3528 liters of additive aqueous sodium silicate solution containing about 12.6 weight percent SiO$_2$ and having an SiO$_2$:Na$_2$O molar ratio of about 3.2 and by adding 846 liters of about 30 weight percent aqueous sulfuric acid as necessary to maintain the pH at about 8.5. The sequential additions to form the fourth and fifth reaction mixtures were made over a collective time period of 80 minutes. The fifth reaction mixture was aged with agitation at 95° C. for 45 minutes. With agitation, water and 259 liters of about 30 weight percent aqueous sulfuric acid were added to the aged fifth reaction mixture to form a sixth reaction mixture having a pH of 4.5. A total of 568 liters of water was added during formation of the fourth through the sixth reaction mixtures. The sixth reaction mixture was aged with agitation and without temperature maintenance for 653 minutes. The final temperature was 82° C. The aged sixth reaction mixture was divided into two batches of about 40504 liters and 39747 liters, respectively. Each batch was filtered in a filter press. The filter cakes were washed with water until the conductivity of the filtrate had dropped to about 5 micromohs/cm. A portion of the washed filter cakes from the first filter press batch was removed and set aside. The remainder of the washed filter cakes and added water were mixed with a Cowles blade to form a solid in liquid suspension containing 12 percent solids by weight. The suspension was dried in a Bowen spray drier (inlet temperature about 620° C.; outlet temperature about 130° C.) to form the reinforced precipitated silica product. The product had a surface area of 236 square meters per gram, a pore diameter at the maximum of the volume pore size distribution function of 15 nanometers, and a total intruded volume of 3.2 cubic centimeters per gram.

EXAMPLE IV

Filter cakes set aside from the first filter press batch in Example III were added to a Cowles liquifier along with water to produce 1181 liters of a 10 weight percent solids suspension; this is equivalent to 124.4 kilograms of dry weight silica. While agitating, 19.3 kilograms of Petrarch CPS340 silanol terminated polydimethylsiloxane (average molecular weight 400–700; kinematic viscosity of 15–35 centistokes; functionality is 4–6 weight percent) (Petrarch Systems) was added to form a first batch of feedstock. This procedure was repeated to form a second batch of feedstock. Both batches were combined. The combined batches were spray dried as described in Example III.

A portion of the spray dried powder was micronized in a fluid energy mill using compressed air as the working fluid. The micronized powder was put into trays and heat-treated in a circulating air oven at 270° C. for 16 hours to produce a first hydrophobized reinforced amorphous precipitated silica (HRAPS 1).

The remainder of the spray dried powder was micronized in a Jet-O-Mizer Model 0405-C fluid energy mill (Fluid Energy Processing & Equipment Co.) using steam as the working fluid to produce a second hydrophobized reinforced amorphous precipitated silica (HRAPS 2). The temperature of the injected steam was about 275° C. and the outlet temperature was about 130° C.

After cooling to about room temperature, HRAPS 1 and HRAPS 2 were each separately compounded with a commercial silicone elastomeric gum and a commercial processing aid. Blending was done in a Baker-Perkins mixer. After massing, each mixture was heat treated at about 150° C. for about one hour under mild vacuum. The mixtures were then aged at ambient conditions at least 24 hours. Each mixture was then put on a two-roll rubber mill and initiator and thermal stabilizer were added. Each mixture was then sheeted out and pressed into a test slab about 2.03 millimeters thick and cured for 10 minutes at 170° C. under a pressure of 10.3 megapascals. Dumbbell specimens were died out according to ASTM D412-87, Die C, and hung in a circulating air oven at 250° C. for one hour. The resulting post-cured specimens were tested according to ASTM D2240-86 for durometer Shore A hardness and according to ASTM D412-87, Method A, for tensile strength and percent elongation at break. Comparative samples were prepared in a similar manner using fumed silica instead of the hydrophobized reinforced precipitated silicas described above. The components and their amounts are shown in Table 1 and the test results are shown in Table 2.

TABLE 1

| Sample No. | 1 | 2 | 3 |
|---|---|---|---|
| Components, parts by weight | | | |
| Silicone Gum (1) | 100 | 100 | 100 |
| Processing Aid (2) | 4 | 4 | 8 |
| HRAPS 1 (3) | 46 | 0 | 0 |
| HRAPS 2 (3) | 0 | 46 | 0 |
| Fumed Silica (4) | 0 | 0 | 40 |
| Initiator (5) | 0.5 | 0.5 | 0.5 |
| Thermal Stabilizer (6) | 1 | 1 | 1 |

(1) Silastic ® Q4-2735 poly(dimethylsiloxane) (Dow Corning Corp.) with vinyl groups attached.
(2) Silastic ® Q4-2737 Processing Aid (Dow Corning Corp.)
(3) This is equivalent to about 40 parts of silica on a dry weight basis.(4)
(4) Cab-O-Sil ® MS-75 fumed silica (Cabot Corp.)
(5) 2,5-dimethyl-2,5-bis(tert-butylperoxy)hexane
(6) Silastic ® HT-1 Heat Stabilizer (Dow Corning Corp.)

TABLE 2

| Sample No. | 1 | 2 | 3 |
|---|---|---|---|
| Tensile Strength, MPa | 9.05 | 9.07 | 9.26 |
| Elongation, percent | 386 | 387 | 393 |
| Durometer, Shore A | 60 | 66 | 57 |

Although the present invention has been described with reference to specific details of certain embodiments thereof, it is not intended that such details should be regarded as limitations upon the scope of the invention except insofar as they are included in the accompanying claims.

We claim:

1. An elastomeric composition comprising:
   (a) crosslinked poly(diorganosiloxane), and
   (b) reinforced amorphous precipitated silica having, on a coating-free and impregnant-free basis, a surface area of from about 220 to about 340 square meters per gram, a pore diameter at the maximum of the volume pore size distribution function of from about 9 to about 20 nanometers, and a total intruded volume of from about 2.6 to about 4.4 cubic centimeters per gram;

said silica being distributed substantially uniformly throughout said crosslinked poly(diorganosiloxane).

2. The elastomeric composition of claim 1 wherein said surface area is from about 220 to about 300 square meters per gram.

3. The elastomeric composition of claim 1 wherein said surface area is from about 220 to about 270 square meters per gram.

4. The elastomeric composition of claim 1 wherein said pore diameter at the maximum of the volume pore size distribution function is from about 13 to about 18 nanometers.

5. The elastomeric composition of claim 1 wherein said total intruded volume is from about 3 to about 4.4 cubic centimeters per gram.

6. The elastomeric composition of claim 1 wherein said silica contains less than about 0.5 percent by weight alkali metal salt.

7. The elastomeric composition of claim 1 wherein said silica contains less than about 0.2 percent by weight alkali metal salt.

8. The elastomeric composition of claim 1 wherein:
(a) said pore diameter at the maximum of the volume pore size distribution function is from about 13 to about 18 nanometers; and
(b) said total intruded volume is from about 3 to about 4.4 cubic centimeters per gram.

9. The elastomeric composition of claim 8 wherein said surface area is from about 220 to about 300 square meters per gram.

10. The elastomeric composition of claim 8 wherein said surface area is from about 220 to about 270 square meters per gram.

* * * * *